United States Patent [19]

Smits

[11] Patent Number: 5,391,317
[45] Date of Patent: Feb. 21, 1995

[54] PROCESS FOR PREPARING A POLYURETHANE FOAM IN THE PRESENCE OF A HYDROCARBON BLOWING AGENT

[75] Inventor: Guido F. Smits, Wijnegem, Belgium

[73] Assignee: The Dow Chemical, Midland, Mich.

[21] Appl. No.: 254,226

[22] Filed: Jun. 6, 1994

Related U.S. Application Data

[63] Continuation of Ser. No. 174,555, Dec. 27, 1993.

[51] Int. Cl.⁶ ............................ C09K 3/00; C08J 9/14
[52] U.S. Cl. .................. 252/182.24; 521/131; 521/159; 521/902
[58] Field of Search .................. 252/182.24; 521/131, 521/159, 902

[56] References Cited

U.S. PATENT DOCUMENTS

| | | | |
|---|---|---|---|
| 2,846,408 | 8/1958 | Brochhagen et al. | 260/2.5 |
| 3,297,597 | 1/1967 | Edwards et al. | 525/2.5 |
| 3,470,118 | 9/1969 | Forester | 260/2.5 |
| 3,586,651 | 6/1971 | Salyer et al. | 260/2.5 |
| 4,046,721 | 9/1977 | Austin et al. | 260/2.5 |
| 4,137,265 | 1/1979 | Edwards et al. | 521/167 |
| 4,383,102 | 5/1983 | McDaniel et al. | 528/107 |
| 4,394,491 | 7/1983 | Hoffman | 525/452 |
| 4,704,410 | 11/1987 | Booth et al. | 521/166 |
| 4,704,411 | 11/1987 | Gansow et al. | 521/166 |
| 4,883,826 | 11/1989 | Marugg et al. | 521/164 |
| 4,920,154 | 4/1990 | Monstrey | 521/131 |
| 4,939,182 | 7/1990 | Marugg et al. | 521/136 |
| 5,001,164 | 3/1991 | Smits et al. | 521/131 |
| 5,034,424 | 7/1991 | Wenning et al. | 521/109.1 |
| 5,064,872 | 11/1991 | Monstrey et al. | 521/131 |
| 5,096,933 | 3/1992 | Volkert | 521/131 |
| 5,120,815 | 6/1992 | Marugg et al. | 528/162 |
| 5,182,309 | 1/1993 | Huetzen | 521/99 |
| 5,223,549 | 6/1993 | Wiedermann et al. | 521/107 |
| 5,254,597 | 10/1993 | Horn et al. | 521/131 |
| 5,290,823 | 3/1994 | Volkert | 521/131 |

FOREIGN PATENT DOCUMENTS 0472080  6/1992  European Pat. Off. .

Primary Examiner—Morton Foelak

[57] ABSTRACT

This disclosure relates to polyisocyanate-based foams, particularly to polyurethane or polyurethane-polyisocyanurate foam prepared in the presence of a certain blowing agent. The blowing agent, based on total amounts of a) and b), consists of: (a) from about 5 to about 80 mole percent of a $C_{5-6}$ alicyclic alkane or mixtures of such; and (b) from about 95 to about 20 mole percent of a mixture of isopentane and n-pentane present in a mole ratio of from about 80:20 to about 20:80.

1 Claim, 1 Drawing Sheet

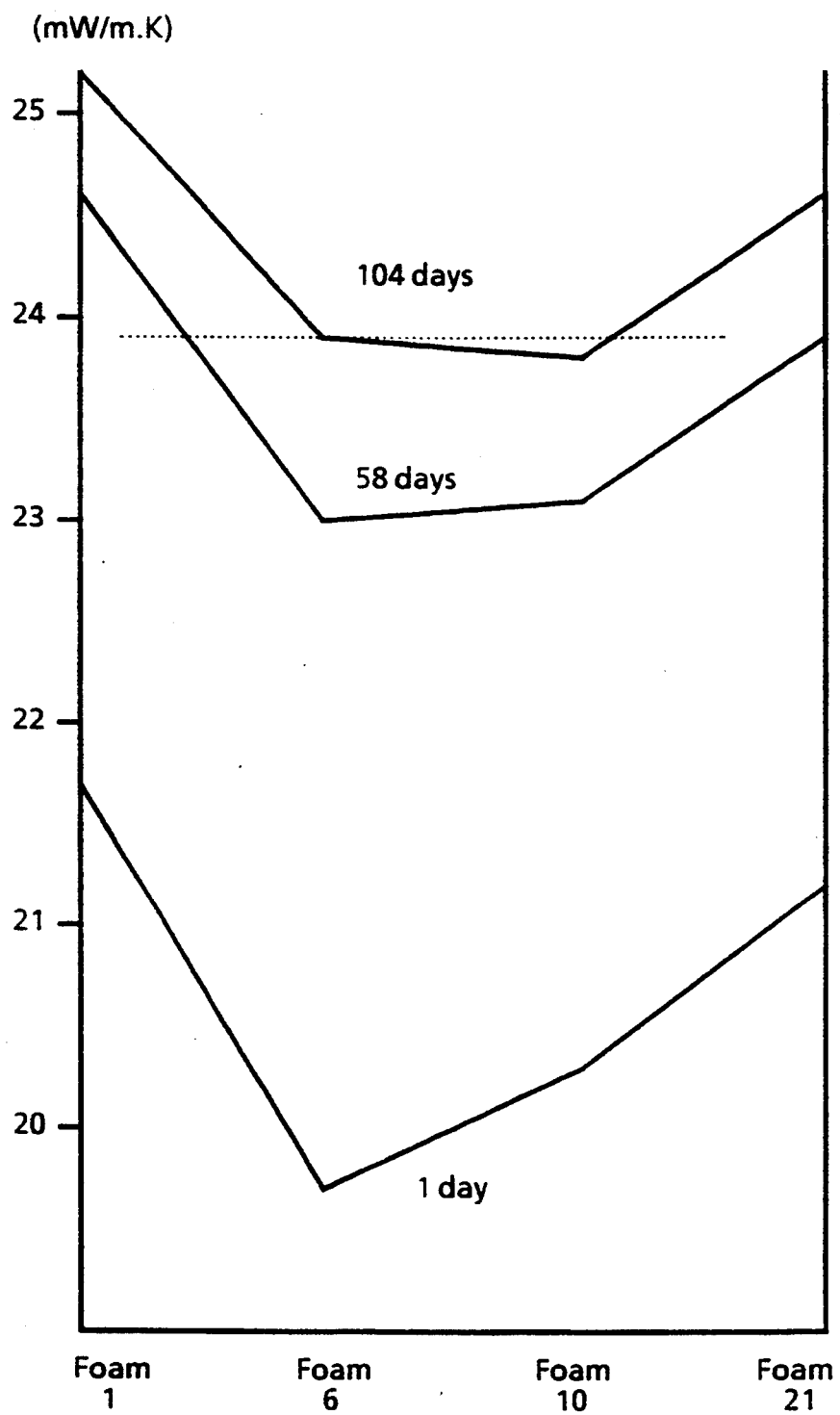

PROCESS FOR PREPARING A POLYURETHANE FOAM IN THE PRESENCE OF A HYDROCARBON BLOWING AGENT

CROSS-REFERENCE TO RELATED APPLICATION

This is a continuation of application Ser. No. 08/174,555, filed Dec. 27, 1993.

BACKGROUND OF THE INVENTION

This invention relates to a polyurethane or polyurethane-polyisocyanurate foam prepared in the presence of a blowing agent which consists of an alicyclic and an aliphatic alkane.

It is well known to prepare cellular polyurethanes by reacting a polyisocyanate with an active hydrogen-containing material in the presence of a halocarbon blowing agent. In preparing flexible polyurethane foam, for example, halocarbons are often used to supplement water in generating a gas for blowing. However, the use of halocarbon blowing agents is particularly significant in making rigid foam. In rigid foam, the halocarbon blowing agent additionally provides thermal insulating properties and usually constitute the major proportion of the blowing agent when preparing a rigid foam. Of the halocarbons, trichlorofluoromethane (R-11), dichlorodifluoromethane (R-12) and trichlorotrifluoroethane (R-113) are of the most commercial importance; due to their advantageous thermal insulating properties, boiling points and stability. A disadvantage of these substances is that they are highly suspected of contributing to the depletion of atmospheric ozone. Accordingly, it would be highly desirable to replace the halocarbons with other blowing agents which are not believed to cause such environmental damage. Other blowing agents contemplated include hydrocarbons.

The general use of hydrocarbons including aliphatic and alicyclic alkanes as blowing agent when preparing polyurethane foam is known. U.S. Pat. No. 5,182,309 and European patent application EP-A-472,080 disclose the use of aliphatic alkanes including pentane as polyurethane blowing agent. U.S. Pat. No. 3,586,651 discloses the use of a cyclopentane/acetone mixture as blowing agent when preparing rigid, closed celled, polyurethane foam. Similarly in U.S. Pat. Nos. 5,096,933 and 5,034,424 the use of cyclopentane and/or cyclohexane in combination with other blowing agents to prepare polyurethane foam is disclosed. Combinations of halocarbons and hydrocarbons as polyurethane blowing agent are also disclosed in U.S. Pat. Nos. 5,132,332 and 5,001,164. Whilst use of hydrocarbons as blowing agent provides vis-a-vis ozone depletion a more environmentally acceptable system frequently, they do not permit the preparation of foam with long term commercially attractive physical properties including thermal insulation and dimensional stability characteristics.

Accordingly, it would be desirable to develop a process for the preparation of polyurethane foam in the presence of a halogen-free blowing agent and where the resulting foam exhibits long term thermal insulation and dimensional stability characteristics better suited to present commercial and environmental demands.

SUMMARY OF THE INVENTION

In one aspect, this invention is a process for preparing a polyurethane or polyisocyanurate foam by reacting an organic polyisocyanate with a polyahl in the presence of a physical blowing agent characterized in that the physical blowing agent, based on total amounts of a) and b), consists of:

a) from about 5 to about 80 mole percent of a $C_{5-6}$ alicyclic alkane or mixtures of such; and b) from about 95 to about 20 mole percent of a mixture of isopentane and n-pentane present in a mole ratio of from about 80:20 to about 20:80.

In a second aspect, this invention is a process for preparing a polyurethane or polyisocyanurate foam by reacting components comprising an organic polyisocyanate having an average of from about 2 to about 3.5 isocyanate groups/molecule with a polyahl in the presence of water and a physical blowing agent wherein, (a) the polyahl contains per 100 parts by weight of total polyahl:

a1) from about 30 to about 90 parts of an aromatic-initiated polyether polyol;

a2) from about 5 to about 35 parts of a liquid aromatic polyester polyol; and a3) from about 5 to about 35 parts of an amine-initiated polyether polyol, (b) the water is present in from about 1.5 to about 10 parts per 100 parts by total weight of polyahl, and (c) the physical blowing agent, based on total amounts of c1) and c2), consists of:

c1) from about 5 to about 80 mole percent of a $C_{5-6}$ alicyclic alkane or mixtures of such; and c2) from about 95 to about 20 mole percent of isopentane and n-pentane present in a mole ratio of from about 80:20 to about 20:80.

In a third aspect, this invention relates to a polyurethane or polyisocyanurate foam prepared by the process of this invention.

In a fourth aspect, this invention relates to an isocyanate-reactive composition for use in the preparation of polyurethane or polyisocyanurate foam which comprises a polyahl, water, and a physical blowing agent characterized in that:

a) the polyahl contains an aromatic-initiated polyether polyol present in from 30 to 90 parts per 100 parts by total weight of polyahl;

b) the water is present in from about 1.5 to about 10 parts per 100 parts by total weight of polyahl; and c) the physical blowing agent, based on total amounts of c1) and c2), consists of:

c1) from about 5 to about 80 mole percent of a $C_{5-6}$ alicyclic alkane or mixtures of such; and c2) from about 95 to about 20 mole percent of a mixture of isopentane and n-pentane present in a mole ratio of from about 80:20 to about 20:80.

In a fifth aspect, this invention relates to a hydrocarbon composition suitable for use as a physical blowing agent when preparing a polyurethane or polyisocyanurate foam which, based on total amounts of a) and b), consists of:

a) from about 5 to about 80 mole percent of a $C_{5-6}$ alicyclic alkane or mixtures of such; and b) from about 95 to about 20 mole percent of a mixture of isopentane and n-pentane present in a mole ratio of from about 80:20 to about 20:80.

BRIEF DESCRIPTION OF THE DRAWING

FIG. 1 illustrates the change with time of the thermal conductivity of polyurethane foam prepared in the presence of, with reference to the examples later described, different hydrocarbon blowing agent mixtures. Foam 10 is illustrative of the present invention, Foams 1, 6 and 21 are comparative foams.

DETAILED DESCRIPTION OF THE INVENTION

In this invention, a hydrocarbon mixture is used as physical blowing agent to prepare a polyurethane or polyisocyanurate foam. The blowing agent consists of, as first component, an alicyclic $C_{5-6}$ alkane or mixtures of such; and as second component, a mixture of isopentane with n-pentane in a mole ratio of from about 80:20 to about 20:80. The blowing agent contains, based on total amount of first and second component present, the first component in from about 5 to about 80 mole percent; and the second component in from about 95 to about 20 mole percent. When it is intended to use the resulting foam in appliance applications, for reasons of long term thermal insulation performance and dimensional stability, it is found advantageous to have the isopentane and n-pentane isomers present in a mole ratio of from about 80:20 to about 60:40. When it is intended to use the resulting foam in construction applications, having different performance requirements to an appliance application, it is found advantageous to have the isopentane and n-pentane isomers present in a mole ratio of from about 40:60 to about 20:80.

As first component, suitable $C_{5-6}$ alicyclic alkanes include cyclopentane, methylcyclopentane, cyclohexane, or mixtures of two or more of these. Preferred is cyclopentane, and especially cyclohexane due to its lower gas thermal conductivity. When the first component is cyclopentane advantageously, for reasons or boiling point and partial pressure, it is present in from about 5 to about 80, preferably in from about 15 to about 60, and more preferably in from about 20 to about 45 mole percent. Conversely, the second component advantageously is present in from about 95 to about 20, preferably from about 85 to about 40, and more preferably from about 80 to about 55 mole percent. When the first component is methylcyclopentane or cyclohexane, or mixtures containing a majority of either of these alkanes, advantageously it is present in from about 5 to about 40, preferably in from about 10 to about 35, and more preferably in from about 20 to 35 mole percent. Conversely, the second component advantageously is present in from about 95 to about 60, preferably from about 90 to about 65, and more preferably from about 80 to about 65 mole percent.

The hydrocarbon mixture of this invention is useful in preparing cellular polymers such as, for example, polyisocyanate-based foam including microcellular elastomers and especially rigid, polyurethane and polyisocyanurate foams. In preparing such foam, an organic polyisocyanate is reacted with a polyahl in the presence of the hydrocarbon mixture, and optionally water. It is often convenient to preblend the mixture with the polyahl before contacting same with the polyisocyanate. It is, however, possible to simultaneously blend the polyisocyanate, polyahl and hydrocarbon mixture in the production of foam. In making cellular polymers, it is advantageous to employ sufficient blowing agent to provide a polymer having an overall density from about 10 to about 700, preferably about 15 to about 300, and more preferably about 20 to about 100 kg/m$^3$. To provide for such density, typically the hydrocarbon mixture is present in an amount of from about 1 to about 25, preferably from about 3 to about 22, and more preferably in from about 10 to about 20 parts per 100 parts by weight of polyahl.

Polyahls which are useful in the preparation of the polyisocyanate-based cellular polymers include those materials having two or more groups containing an active hydrogen atom capable of undergoing reaction with an isocyanate. Preferred among such compounds are materials having at least two hydroxyl, primary or secondary amine, carboxylic acid, or thiol groups per molecule. Polyols, i.e., compounds having at least two hydroxyl groups per molecule, are especially preferred due to their desirable reactivity with polyisocyanates. Typically polyahls suitable for preparing rigid polyurethanes include those having an equivalent weight of about 50 to about 700, preferably about 70 to about 300 and more preferably about 70 to about 150. Such polyahls also advantageously have a functionality of at least 2, preferably about 3, and up to about 16, preferably up to about 8, active hydrogen atoms per molecule. Representative of polyahls include polyether polyols, polyester polyols, polyhydroxy-terminated acetal resins, hydroxyl-terminated amines and polyamines. Examples of these and other suitable isocyanate-reactive materials are described more fully in U.S. Pat. No. 4,394,491, particularly in columns 3 to 5. Preferred for preparing rigid foams, on the basis of performance, availability and cost, is a polyol prepared by adding an alkylene oxide to an initiator having from about 2 to about 8, preferably about 3 to about 8 active hydrogen atoms. Exemplary such polyols include those commercially available under the trademark designation VORANOL including VORANOL 202, VORANOL 360, VORANOL 370, VORANOL 446, VORANOL 490, VORANOL 575, VORANOL 800, all sold by The Dow Chemical Company, and PLURACOL 824, sold by BASF Wyandotte. Other highly preferred polyols include alkylene oxide derivatives of Mannich condensates, as disclosed, for example, in U.S. Pat. Nos. 3,297,597; 4,137,265 and 4,383,102; and aminoalkylpiperazine-initiated polyethers as described in U.S. Pat. Nos. 4,704,410 and 4,704,411.

In a preferred embodiment of this invention, the polyahl is a composition comprising an aromatic-initiated polyether polyol in from about 30 to about 90 parts per 100 parts by total weight of the polyahl composition. Further to the aromatic-initiated polyether polyol, the composition may also comprise an amine-initiated polyether polyol in from about 5 to about 35 parts per 100 parts by total weight of the composition; or alternatively an aromatic polyester polyol, liquid at room temperature, in from about 5 to about 35 parts per 100 parts by total weight of the composition. In a highly preferred embodiment of this invention, the polyahl composition contains the aromatic-initiated polyether polyol in from about 30 to about 90 parts; the amine-initiated polyether polyol in from about 5 to about 35 parts ; and the aromatic polyester polyol in from about 5 to about 35 parts per 100 parts by total weight of the composition. Advantageously, the aromatic-initiated polyether polyol is an alkylene oxide adduct of a phenol/formaldehyde resin, frequently called a "novolac" polyol, such as disclosed in U.S. Pat. Nos. 3,470,118 and 4,046,721, or an alkylene oxide adduct of phenol/formaldehyde/alkanolamine resin, frequently called a "Mannich" polyol such as disclosed in U.S. Pat. Nos. 4,883,826; 4,939,182; and 5,120,815.

Polyisocyanates useful in making polyurethanes include aliphatic and cycloaliphatic and preferably aromatic polyisocyanates or combinations thereof, advantageously having an average of from about 2 to about 3.5, and preferably from about 2.4 to about 3.2 isocyanate groups per molecule. Representative of suitable polyisocyanates include m- or p-phenylene diisocyanate, 2,4- or 2,6- toluene diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5',5'-tetraisocyanate and the diverse polymethylene polyphenyl polyisocyanates. A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. Especially preferred, due to their ability to crosslink the polyurethane, are methylene-bridged polyphenylpolyisocyanates. The ratio of equivalents of isocyanates to equivalents of active hydrogen atoms is advantageously from about 0.5 to about 5, preferably about 0.9 to about 2, more preferably about 1.0 to about 1.5. When the same ratio is expressed as a multiple of 100 this is then the isocyanate index.

In addition to the foregoing critical components, it is often desirable to employ certain other ingredients in preparing cellular polymers. Among these additional ingredients are water, catalysts, surfactants, flame retardants, preservatives, colorants, antioxidants, reinforcing agents, fillers, and the like.

Advantageously, water is present to supplement the blowing capacity already provided by the hydrocarbon mixture. Water reacts with isocyanate leading the production of carbon dioxide. When present, the water is preferably used in amounts of from about 1 to about 10, preferably from about 1.5 to about 8, and more preferably from about 2 to about 6, and yet more preferably in from about 2.5 to about 5 parts per 100 parts by total weight of the polyahl.

Other auxiliaries useful when producing polyurethanes include surfactants, pigments, colorants, fullers, fibers, antioxidants, catalysts, flame retardants, stabilizers and the like. In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by weight polyahl are sufficient for this purpose.

One or more catalysts for the reaction of the polyol (and water, if present) with the polyisocyanate are advantageously used. Any suitable urethane catalyst may be used, including tertiary amine compounds and organometallic compounds. Exemplary tertiary amine compounds include triethylenediamine, N-methylmorpholine, N,N-dimethylcyclohexylamine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N',N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. Such catalysts are used in an amount which measurably increases the rate of polyurethane or polyisocyanurate formation. Typical amounts are about 0.001 to about 1 parts of catalyst per 100 parts by weight of polyahl.

In making a polyurethane foam, the polyol(s), polyisocyanate and other components are contacted, thoroughly mixed and permitted to expand and cure into a cellular polymer. The particular mixing apparatus is not critical, and various types of mixing head and spray apparatus are conveniently used. It is often convenient, but not necessary, to preblend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to prereact all or a portion of the polyol(s), in the absence of water, with the polyisocyanate to form a prepolymer, although such is not preferred.

The polyurethane foam of this invention is useful in a wide range of applications, such as in spray insulation, appliance foam, rigid insulating boardstock, laminates, and many other types of rigid foam.

The following examples are given to illustrate the invention and are not intended to limit the scope thereof. Unless stated otherwise, all parts and percentages are given by weight.

EXAMPLE 1

Molded polyurethane foam is prepared by reacting, at an NCO index of 1.25, VORANATE M220 a crude methylene diphenylisocyanate, average NCO functionality 2.7, available from The Dow Chemical Company with a polyahl composition in the presence of water, catalyst, and surfactant as detailed below. The components, at about 20° C., are mixed and stirred for 10 seconds at about 3000 rpm using a propeller mixer prior to pouring the reacting mixture into a mold having dimensions 30×30×10 cm. Sufficient reacting mixture is poured into the mold to provide molded foam having an overall density of about 34 kg/m$^3$. The hydrocarbon blowing agent composition used to prepare the individual foams along with the physical properties of the free-rise foam is reported in Table 1.

---

78.7 pbw oxyethylene-oxypropylene adduct of a phenol/formaldehyde resin, Hydroxyl

TABLE 1

|  | 1* | 2* | 3* | 4* | 5* | 6* | 7* | 8 | 9 | 10 | 11* |
|---|---|---|---|---|---|---|---|---|---|---|---|
| Blowing Agent | | | | | | | | | | | |
| Cyclopentane (pbw) | 0 | 2.93 | 5.86 | 8.8 | 11.73 | 14.66 | 0 | 2.93 | 5.86 | 8.8 | 11.73 |
| (mole %) | (0%) | (21%) | (41%) | (61%) | (81%) | (100%) | (0%) | (21%) | (41%) | (60%) | (81%) |
| Pentane (pbw) | 14.25 | 11.4 | 8.55 | 5.7 | 2.85 | 0 | 14.25 | 11.4 | 8.55 | 5.7 | 2.85 |
| (mole %) | (100%) | (79%) | (59%) | (39%) | (19%) | (0%) | (100%) | (79%) | (59%) | (40%) | (19%) |
| Ratio iso-:n-pentane | 0:100 | 0:100 | 0:100 | 0:100 | 0:100 | / | 20:80 | 25:75 | 33:66 | 50:50 | 100:0 |
| Molded density (kg/m$^3$) | 34.3 | 34.3 | 34.7 | 34.9 | 33.9 | 33.8 | 34.1 | 34.3 | 33.7 | 33.8 | 34.9 |
| Thermal Conductivity, parallel to rise (mW/m.K): | | | | | | | | | | | |
| a) Initial | 21.7 | 20.8 | 21.1 | 20.4 | 19.8 | 19.7 | 21.0 | 20.9 | 20.6 | 20.3 | 20.4 |
| b) after 58 days | 24.6 | 23.8 | 24.2 | 23.7 | 22.8 | 23.0 | 24.0 | 23.8 | 23.3 | 23.1 | 23.8 |
| % change | 13.3 | 14.4 | 14.7 | 16.2 | 15.2 | 16.8 | 14.3 | 13.9 | 13.1 | 13.8 | 16.7 |
| Cell Size (microns) | 374 | 372 | 400 | 387 | 379 | 378 | 373 | 372 | 376 | 383 | 373 |
| Dimensional Stability at 0° C.: | | | | | | | | | | | |
| a) 1 day | 0 | −2.0 | −1.4 | −0.2 | −0.9 | −14.0 | −0.2 | −2.0 | −1.3 | −1.0 | −6.2 |
| b) 57 days | −1.5 | −6.6 | −15.7 | −0.4 | −12.4 | −24.6 | −24.6 | −3.1 | −11.6 | −3.0 | −23.1 |

|  | 12* | 13 | 14 | 15* | 16* | 17 | 18* | 19* | 20* | 21* |
|---|---|---|---|---|---|---|---|---|---|---|
| Blowing Agent | | | | | | | | | | |
| Cyclopentane (pbw) | 0 | 2.93 | 5.86 | 8.8 | 0 | 2.93 | 5.86 | 0 | 2.93 | 0 |
| (mole %) | (0%) | (21%) | (41%) | (61%) | (0%) | (21%) | (41%) | (0%) | (21%) | (0%) |
| Pentane (pbw) | 14.25 | 11.4 | 8.55 | 5.7 | 14.25 | 11.4 | 8.55 | 14.25 | 11.4 | 14.25 |
| (mole %) | (100%) | (79%) | (59%) | (39%) | (100%) | (79%) | (59%) | (100%) | (79%) | (100%) |
| Ratio iso-:n-pentane | 40:60 | 50:50 | 66:33 | 100:0 | 60:40 | 75:25 | 100:0 | 80:20 | 100:0 | 100:0 |
| Molded density (kg/m$^3$) | 34.2 | 34.4 | 33.8 | 34 | 34.4 | 33.9 | 33.7 | 34.3 | 34.4 | 33.9 |
| Thermal Conductivity, parallel to rise (mW/m.K): | | | | | | | | | | |
| a) Initial | 21.4 | 20.8 | 20.4 | 20.8 | 21.6 | 21.4 | 20.7 | 21.5 | 20.9 | 21.2 |
| b) after 58 days | 24.0 | 23.8 | 23.3 | 23.5 | 24.4 | 24.0 | 23.5 | 24.2 | 23.5 | 23.9 |
| % change | 12.1 | 14.4 | 14.2 | 13 | 13 | 12.1 | 13.5 | 12.5 | 12.4 | 12.7 |
| Cell Size (microns) | 397 | 353 | 381 | 392 | 370 | 369 | 390 | 370 | 369 | 386 |
| Dimensional Stability: | | | | | | | | | | |
| a) 1 day | −0.6 | −2.7 | −10.4 | −0.8 | −0.6 | −0.8 | −6.6 | −1.7 | −0.6 | 0 |
| b) 57 days | −2.3 | −17.1 | −24.0 | −2.0 | −1.5 | −2.2 | −21.9 | −11.4 | −1.1 | −1.1 |

*Not an example of this invention

Number 196.
26.2 pbw NIAX APP 315, an aromatic polyester polyol with Hydroxyl No 315, available from Union Carbide Co.
26.2 pbw VORANOL RA640, an oxypropylene adduct of ethylene diamine, hydroxyl number 640, available from The Dow Chemical Company.
13 pbw diethylene glycol
1.8 pbw water
3.25 pbw TEGOSTAB B8408, a proprietary silicon-based surfactant available from Th. Goldschmidt AG.
1.17 pbw dimethylcyclohexylamine
1.3 pbw CURITHANE 206, a proprietary urethane catalyst available from The Dow Chemical Company.

Where reported the physical properties of the foams are observed according to the following test procedure for; core density, DIN 53420; thermal conductivity, ISO 2581; compressive strength, DIN 53421; and dimensional stability ISO 2796. When reported the average cell size, diameter, is determined from inspection of a thin section using a polarized-light optical microscope in combination with a Quantimet 520 Image Analysis system. The accuracy of the measurement is considered to be ±0.02 mm (20 micrometers).

When the thermal conductivity performance of Foam 10 and Comparative Foams 1, 6 and 21 is followed for an extended period of time, the advantageous long term thermal insulation performance of foams prepared with the herein defined hydrocarbon blowing agent mixture becomes apparent. Foam 6 starts to exhibit a minimum loss of thermal insulation performance relative to its initial value and when compared to the other foams; and to exhibit a minimum thermal conductivity value compared to the other foams. FIG. 1 shows the advantageous thermal insulation properties of Foam 6, over the other foams, after aging for 104 days.

| Days | Thermal Conductivity (mW/m.K) | | | |
|---|---|---|---|---|
|  | Foam 1 | Foam 6 | Foam 10 | Foam 21 |
| 1 | 21.7 | 19.7 | 20.3 | 21.2 |
| 58 | 24.6 | 23.0 | 23.1 | 23.9 |
| 104 | 25.2 | 23.9 | 23.8 | 24.6 |
| Difference: after 104 days | 3.5 | 4.2 | 3.5 | 3.4 |
| Dimensional Stability: (57 days) | −1.5 | −24.6 | −3.0 | −1.1 |

These observations along with the reported dimensionally stability performance indicate that polyurethane foam prepared according to this invention is superior to that of the art.

What is claimed is:

1. An isocyanate-reactive composition for use in the preparation of polyurethane or polyisocyanurate foam which comprises a polyahl, water, and a physical blowing agent characterized in that:

a) the polyahl contains an aromatic-initiated polyether polyol present in from 30 to 90 parts per 100 parts by total weight of polyahl;

b) the water is present in from about 1.5 to about 10 parts per 100 parts by total weight of polyahl; and c) the physical blowing agent consists, based on total amounts of c1) and c2), of:

c1) from about 5 to about 80 mole percent of a $C_{5-6}$ alicyclic alkane or mixtures of such; and c2) from about 95 to about 20 mole percent of isopentane and n-pentane present in a mole ratio of from about 80:20 to about 20:80.

* * * * *